Patented Oct. 19, 1954

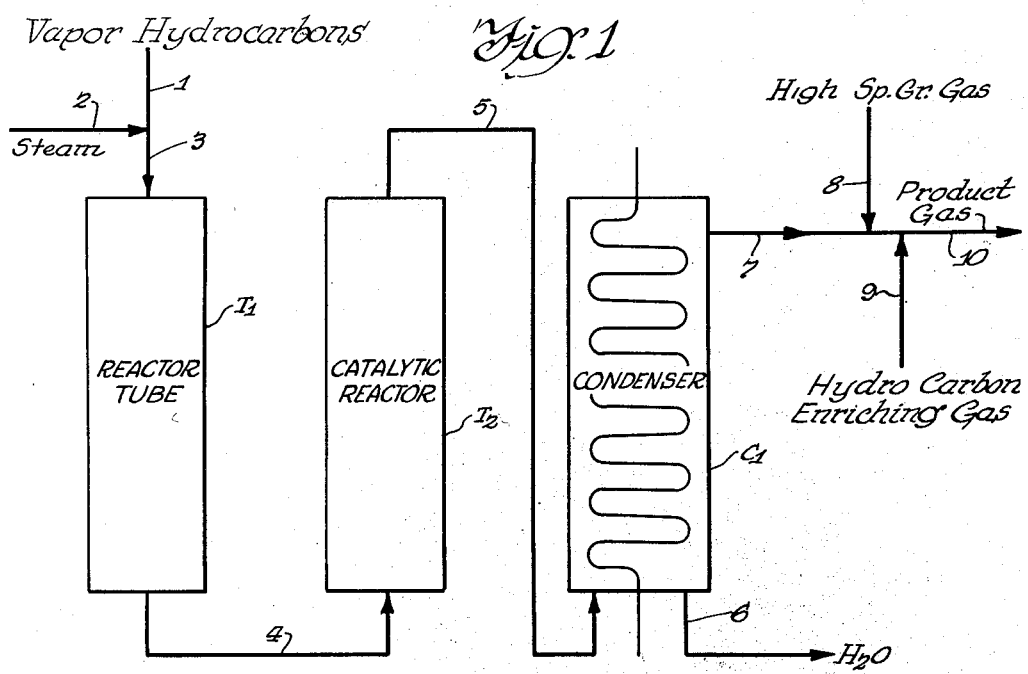
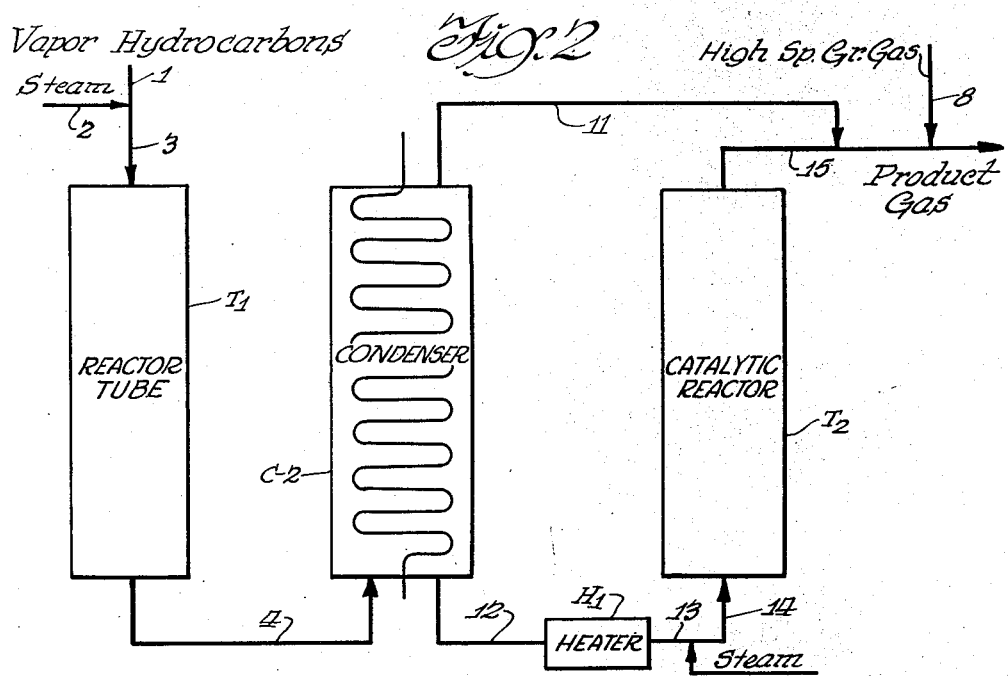

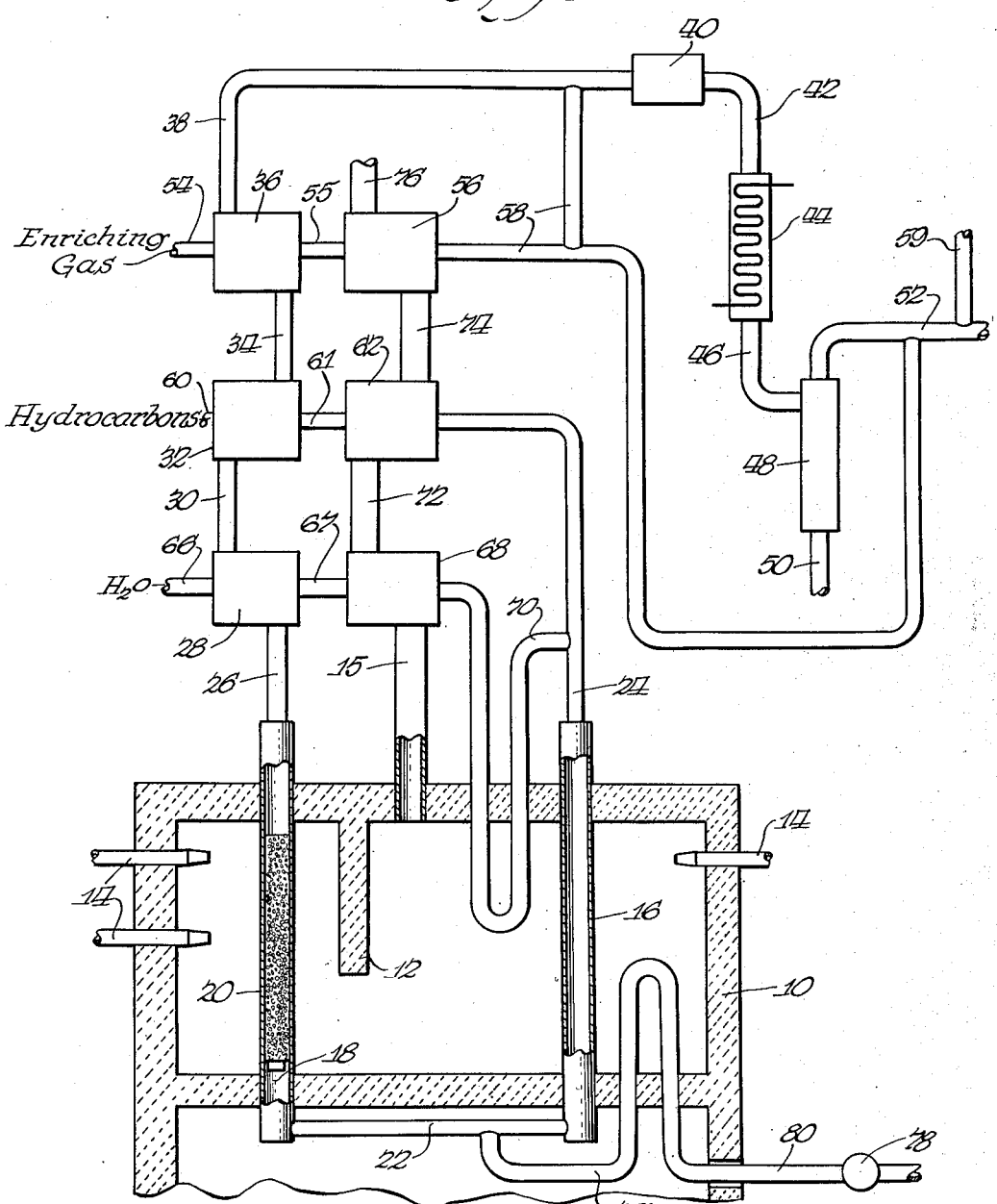

2,692,193

UNITED STATES PATENT OFFICE 2,692,193

METHOD OF PREPARING A GAS INTERCHANGEABLE WITH COKE OVEN GAS, CARBURETED GAS, OR MIXTURES THEREOF

Charles H. Riesz and Pierre C. Lurie, Chicago, Ill., assignors to The Institute of Gas Technology, Chicago, Ill., a corporation of Illinois Application July 29, 1948, Serial No. 41,351

4 Claims. (Cl. 48—214)

This invention relates to method and apparatus for gas manufacture particularly adapted to meet periodic peak demands for domestic gas.

With the increasing demand for gas as a premium fuel for domestic house heating, seasonal variation in gas sendout has been growing from year to year. To meet the resulting peak demands, it is desirable to produce and feed a substitute gas into the mains, or pipelines. Where such feeding is effected in outlying areas far from the main gas generating plant, the substitute gas is fed into the pipelines counter to the normal flow from the main gas generating plant. For this purpose, a substitute gas that is completely interchangeable with the normal sendout gas must be used, since the region where the two gases will meet will vary with the load. More particularly, the substitute gas should have the same specific gravity and heating value as the normal sendout gas.

Such interchangeable substitute gas has been prepared by cracking propane or butane in the presence of steam in a one-stage process, using a nickel catalyst. Such concurrent catalytic cracking and blue gas reaction yield a carrier gas of low gravity (0.40 or higher) and high hydrogen content (50% to 60%). This carrier gas is characterized by a heating value of less than 325 B. t. u. Gases of higher heating value cannot be prepared from propane or butane by catalytic cracking and concurrent reaction with steam without deposition of carbon or an accumulation of naphthalene and tar in the condensing and cooling system, bringing about a pressure block necessitating plant shut-down. The carrier gas obtained by such catalytic cracking in the presence of steam is enriched with propane or butane vapors and the specific gravity of the resulting mixture is adjusted, if necessary, with air, flue gas or the like to form a finished substitute gas having, say, a specific gravity of about 0.70 and a heating value of from 520 to 550 B. t. u. The finished substitute gas can be made completely interchangeable with normal sendout gas, such as carburetted water gas, natural gases, coke oven gas or mixtures thereof or other city gases.

A plant for making a substitute gas by the above described process is particularly adapted for use in meeting seasonal or periodic peak demands, since the plant investment and maintenance costs are low and the plant is characterized by high capacity, flexibility and reliability. It should be understood that the material costs are of secondary importance, since the total quantity of gas produced during peak loads is a relatively small percentage of the total sendout.

From a cost standpoint, one of the larger items of cost in the operation of the plant referred to hereinabove is the cost of storing butane or propane which require storage under pressure, being normally gaseous.

Attempts have been made to prepare a carrier gas by concurrent catalytic cracking and reaction with steam and/or air, using as starting materials cracked gasoline, kerosene, gas oil distillates, crude naphtha or other normally liquid hydrocarbons containing appreciable amounts of aromatic or olefinic hydrocarbons. However, these attempts have turned out to be unsuccessful because of the occurrence of heavy carbon deposits on the catalyst or the formation of relatively large amounts of oily or tarry material fouling the condensing and cooling systems.

We have now provided method and apparatus by which liquid hydrocarbon products containing considerable amounts of aromatic or olefinic constituents may be cracked and concurrently reacted with steam, air or mixtures thereof to form a carrier gas of the type indicated, without deposition of carbon and without formation of oily or tarry material. More particularly, we pass the vapors of a normally liquid hydrocarbon or hydrocarbon mixture containing appreciable amounts of aromatics or olefines, in admixture with steam or air or mixtures thereof, through a tube maintained at from 800° to 1700° F. This tube may be empty or may contain a low activity cracking catalyst, such as alumina, silica, various clays and the like. The product issuing from this tube includes a gas fraction and a vapor fraction. The gas fraction contains a large amount of hydrogen, together with considerable amounts of carbon monoxide, carbon dioxide, illuminants, methane and ethane. The vapor fraction constitutes upwardly of 20% of the total amount of discharged material, for instance, from 40% to 60%, and can be condensed at lower temperatures to form a liquid of different boiling range than the material charged into the tube. The material discharged from the above mentioned tube is passed through a second tube maintained at from 1000° to 2000° F. and containing an active cracking catalyst such as nickel or nickel oxide. In this second tube, the gases and vapors are cracked and concurrently reacted with steam, air or mixtures thereof to yield a carrier gas comparable to the carrier gas obtained by catalytic cracking of propane and concurrent reaction with steam, air or mixtures thereof. In spite of the fact that the material fed into the second tube contains a major proportion of a normally liquid hydrocarbon product having a boiling point higher than the original starting material, no carbon is deposited in the second tube, nor is any significant amount of oily or tarry material obtained. This absence of carbon deposits and of tar is quite surprising in view of the fact that the original starting material would yield carbon and tars if fed directly into the second tube and in further view of the fact that a major portion of the material passing into the second tube is a normally liquid hydrocarbon mixture of at least as great molecular weight and as complex as the original starting material.

The gaseous fraction of the product discharged from the first tube has a relatively high heating value due to its hydrocarbon content, for instance, about 625 B. t. u. If desired, this gaseous fraction can be separated from the accompanying vapor fraction and then used to enrich the carrier gas from the second tube. In this event, the carrier gas can be produced as disclosed hereinabove, the stream from the first tube being split so that part of the stream is conducted to the second tube and another part is conducted to a condenser for fractionation into a gaseous and a liquid portion. If desired, this liquid portion can then be vaporized and incorporated with the stream entering the second tube.

Other modifications of the above described process are possible and will be described below. We note in this connection, that the apparatus and methods of the present invention offer certain advantages (mentioned hereinbelow) for the gasification of hydrocarbon mixtures devoid of olefinic or aromatic constituents.

It is, therefore, an important object of the present invention to provide methods for manufacturing a substitute gas completely interchangeable with the normal sendout gas of a gas generating plant, the starting material being a normally liquid hydrocarbon mixture that cannot be directly catalytically cracked and concurrently reacted with steam, air or mixtures thereof without carbon deposition and tar formation, and the carrier gas obtained from the starting material being enriched with gases or vapors of high heating value, for instance, propane or butane vapors or gas obtained by cracking hydrocarbon oils or the like.

Another object of the present invention is to provide method for manufacturing a carrier gas suitable for enrichment with propane or butane vapors or the like from a normally liquid hydrocarbon mixture containing appreciable amounts of olefinic and aromatic constituents and not susceptible to direct catalytic cracking and concurrent reaction with steam, air or mixtures thereof without carbon deposition and tar formation.

A further object of this invention is to provide method for manufacturing a substitute gas interchangeable with normal sendout gas starting with a normally liquid hydrocarbon mixture and comprising the step of first cracking said mixture while reacting the same with steam, air or mixtures thereof to form a product including a vapor fraction and a gas fraction of high heating value, further cracking the product of said first step while concurrently reacting the product with air, steam or mixtures thereof to form a carrier gas of low heating value, subjecting additional amounts of said mixture to said first cracking step, separating the gaseous fraction of high heating value obtained from said additional amount, and enriching said carrier gas with said separated gaseous fraction.

Other and further objects and features of the present invention will become apparent from the following description and appended claims taken in conjunction with the appended drawings in which:

Figure 1 is a flow sheet illustrating one method for preparing a substitute gas according to the present invention.

Figure 2 is a flow sheet illustrating another form of the method of the invention.

Figure 3 illustrates diagrammatically a suitable apparatus for carrying out the process of Figure 1.

Proceeding according to the method illustrated in Figure 1, the starting hydrocarbon material 1 is first vaporized and thereafter mixed with superheated steam 2. The resulting mixture 3 of superheated steam and hydrocarbon vapors is passed through a first reaction tube T1. The materials passed into the first reaction tube may be at a temperature of 450° F. or higher before reaching the tube. This tube is externally or otherwise heated to maintain a temperature therein of from 800° to 1700° F., preferably 1000° to 1400° F. The tube may be empty or may contain a low activity cracking catalyst, for instance, bauxite, activated clays of the montmorillonite type, mixtures of alumina and silica, of magnesia and silica or the like. The amount of steam admixed with the hydrocarbon material may range from 0.5 pound to 10 or 12 pounds of steam for each pound of hydrocarbon material.

Under the conditions specified, a product 4 is discharged from the first reaction tube made up of a vapor fraction and a gas fraction. The vapor fraction may amount to 20% or more, for instance, from 40 to 60%. The gas fraction may contain about 50% hydrogen, from 5 to 15% carbon monoxide, from 5 to 15% carbon dioxide, from 10 to 30% illuminants, from 5 to 15% methane, and 2 to 10% ethane. The presence of the carbon oxides indicates the likelihood that a blue gas reaction (water gas reaction) takes place in the first tube.

Next, the material 4 discharged from the first tube is passed through a second or catalyst tube T2 containing an active cracking catalyst such as nickel or nickel oxide, nickel sulphide, nickel thiomolybdate, iron or iron oxides, molybdenum oxide or sulfide, or the like. Preferably, these catalysts are distributed over suitable supporting material. In case of nickel, for instance, the supporting material may be refractory bricks or fragments thereof of appropriate size, other ceramic bodies, magnesite, alumina and bauxite, activated clays, magnesia, silica, or mixtures of silica with alumina or magnesia. An excellent catalyst can be prepared by soaking porous alundum spheres of suitable diameter in a concentrated nickel nitrate solution and heating the spheres at 1000° F., or higher, for instance 1400° F., to form nickel oxide. The nickel content of the ignited spheres should run from 3 to 10% (as metallic nickel) or more.

The second catalyst tube is externally heated to maintain therein a temperature of from 1000° to 2000° F., preferably from 1300° to 1850° F.

The mixture 5 of gas and steam discharged from the second tube is passed through a condenser C1 to remove water 6, leaving carrier gas 7 which is mixed with air, carbon dioxide or flue gas 8 and with an enriching gas or vapor 9 such as propane or butane vapor, to yield a finished substitute gas 10.

Under the conditions indicated hereinabove the carrier gas 7 will be characterized by a heating value of from about 200 to 325 or 350 B. t. u. Typically the gas will contain about 50 to 60% hydrogen, the remainder including from 15 to 25% or more carbon monoxide and from 5 to 15% carbon dioxide together with the nitrogen content of any added air or flue gas.

By way of a preferred modification of the above described process, air in amounts up to 100 cubic feet per pound of hydrocarbon material (or carbon dioxide or flue gas) may be mixed with product 4, to form a mixture of high heating value gas, hydrocarbon vapor, steam and air or carbon dioxide or flue gas, which is then passed through the second tube T2. The added air aids in maintaining the desired temperature in the second tube and reduces the amount of steam required for preventing carbon deposition. Because of its nitrogen content, this air can be utilized in controlling the specific gravity of the finished substitute gas. If no nitrogen is desired in the substitute gas, the corresponding amounts of oxygen may be incorporated with the mixture passing into the second tube in place of the air.

Other modifications include the incorporation of air or carbon dioxide or flue gas with the mixture of hydrocarbon vapors and steam 3, to form a mixture of steam, hydrocarbon vapors and air or carbon dioxide or flue gas which is then passed into the first tube T1. Likewise, the gas mixture 5 issuing from the second tube T2 may be recycled to the first tube T1.

Further modifications include the addition of steam to the gas and vapor mixture 4 discharged from the first tube T1, which mixture is then passed into the second tube T2. In this case, part of the total amount of steam, for instance, from 40 to 60% may be added to the mixture passing into the first tube T1 and the remainder into the mixture passing into the second tube T2. The total amount of steam may be the same as that added in the simplest method or in the preferred method disclosed hereinabove, and the gas and vapor mixture issuing from the first tube T1 may be processed further according to either of said last mentioned methods.

Figure 2 illustrates a further basic modification in which the product 4 from the first tube T1 may be fractionated in a condenser C2 into a gas fraction 11 of high heating value suitable for enriching the carrier gas, and into a liquid fraction 12. The liquid 12 is vaporized in a suitable heater H1 and the vapors 13 are blended with superheated steam to form a mixture 14 which may be passed through the catalytic reactor tube T2 to produce a gas 15. The gas 15 is enriched by adding gas fraction 11 from the condenser C2 and the gravity adjusted by adding heavy gases 8, to produce the final product gas. The mixture 14 may also have air, carbon dioxide or flue gas added thereto and the resulting mixture thereafter passed into the second tube T2.

Instead of steam, air or carbon dioxide or flue gas, in amounts up to 100 cubic feet per pound of hydrocarbon may be mixed with hydrocarbon vapors 1 and the resulting mixture passed through the first tube T1. Steam is then generated in the first tube, by partial combustion of the hydrocarbon vapors, so that the reaction in the first tube is effected in the presence of steam.

It is believed possible that in the above described methods there is effected in the first tube a light selective thermal cracking of long chain paraffins, olefins and of aromatics coupled with a blue gas reaction. In the second tube, further cracking and additional blue gas reaction may take place. In the second tube, the cracking is effected catalytically. In both tubes the cracking is brought about in an atmosphere containing steam and hydrogen. Besides taking part in the blue gas reaction, the steam serves to equalize the temperatures in the externally heated tubes and to reduce the tendency toward carbon deposition. The air that may be present in the mixture entering one or both tubes serves not only to raise the temperature but to reduce the tendency to carbon deposition and to improve the resistance of the catalyst against sulfur. The carbon dioxide formed as a result of reaction of the hydrocarbon with steam or with air, or deliberately added to the reaction mixture, serves as an inert diluent reducing the tendency to carbon deposition and aids in equalizing the temperature within each of the two tubes.

The above described methods are also operative for the preparation of a carrier gas from propane, butane, hexane, natural gasoline and other like hydrocarbon products, which do not contain major quantities of olefins and or aromatics and therefore can be directly treated catalytically with steam without carbon deposition. For the treatment of such starting materials, the apparatus and methods of the present invention offer the advantage of higher permissible space velocities, i. e., greater yields per hour of carrier gas are obtained for each unit volume of catalyst. In other words, a plant according to the present invention is characterized by high capacity. This is of great importance in connection with installations for periodic or seasonal operation to meet peak load demands where the capital investment in apparatus is a major cost item.

A plant for carrying out the manufacture of substitute gas according to the preferred method of the present invention is shown diagrammatically and by way of an illustrative example in Figure 2. This plant includes a furnace 10 of suitable fire resistant material enclosing a space divided into two compartments by a baffle 12 depending from the roof. The enclosed space is heated by burners 14, for instance, two burners to the left of the baffle and one burner to the right. Combustion gases are discharged through a stack 15. An empty cracking tube 16 extends vertically through the furnace to the right of the baffle while a tube 18 containing catalyst 20 extends vertically through the furnace to the left of the baffle 12. The bottom ends of the tubes 16 and 18 are connected by conduit 22 which is preferably insulated or otherwise protected against heat loss, so that gases passing therethrough from tube 16 into tube 18 are maintained, preferably, at at least 1000° F. If desired or necessary, the conduit 22 may be externally heated.

A mixture of hydrocarbon vapor and steam enters into the tube 16 from a conduit 24 for initial cracking and concurrent blue gas reaction (as described hereinabove). Hot air is added to the reaction product issuing from tube 16 into conduit 22, for instance, from the tube 25. The mixture of carrier gas and steam issuing from the tube 18 passes through a conduit 26, a first heat exchanger 28, a conduit 30, a second heat exchanger 32, a conduit 34, and a third heat exchanger 36 into conduit 38. The latter may discharge, if desired, into a cooler 40 and the gas may pass therefrom through a conduit 42, a condenser 44 and a conduit 46 into a water washer 48. The water from the washer is discharged through a conduit 50 and the carrier gas through a conduit 52.

Butane or propane may be conducted from a suitable source (not shown) through a conduit 54, through the third heat exchanger 36, through a conduit 55, and through a fourth heat exchanger 56 into a branched conduit 58 for blending with the carrier gas in the conduits 38 or 52. Air or flue gas may be added to the resulting mixture through the conduit 59 to form the finished substitute gas.

A liquid hydrocarbon mixture from a suitable source (not shown) passes through a conduit 60, the second heat exchanger 32, a conduit 61, a fifth heat exchanger 62 and a conduit 64 into the conduit 24. Superheated steam may be generated by passing water through a conduit 66, through the first heat exchanger 28, through a conduit 67, through a sixth heat exchanger 68 and through a conduit 70, part of which extends within the furnace 10, and thereafter conducted into the junction of the two conduits 24 and 64.

The heat exchangers 68, 62 and 56 are heated by combustion gases from the furnace 10 discharged through the stack 15 into the heat exchanger 68, therefrom through conduit 72 into the heat exchanger 62 and therefrom through conduit 74 into the heat exchanger 56 from which the combustion gases are vented through a duct 76. The heat exchangers 28, 32 and 36 are heated by the mixture of carrier gas and steam discharged from the catalyst tube 18 through conduit 26.

The hot air entering the conduit 22 from conduit 25 is obtained by means of a compressor 78 forcing air through a conduit 80, part of which extends within the furnace 10.

The operation of the above described plant involves the preferred method discussed in connection with the flow sheet. Over and above the steps disclosed in connection with the flow sheet, the specific plant described hereinabove by way of example utilizes the heat contents both of the combustion gases from the furnace and of the product issuing from the second or catalyst tube to preheat the hydrocarbon material entering into the first reaction tube; to vaporize the propane or butane or other material forming the enriching gas; and to generate and superheat the steam passing through the reaction device. It should be understood that the above recovery of heat from the combustion gases and from the mixed carrier gas or steam from the second or catalyst tube can be carried out concurrently and that, if desired, heat can be recovered from either source to the exclusion of the other.

Specific results obtained according to the preferred method are given hereinbelow. The starting material used was a cracked gasoline having the following characteristics:

A. P. I gravity @ 60° F_____ 58.9
Sp. Gr. 60/60° F_____ 0.7432

Heating value:
  B. t. u. per gallon_____ 125,300
  B. t. u. per pound_____ 20,240

A. S. T. M. disillation:
  I. B. P_____°F__ 89
  5_____ 113
  10_____ 127
  20_____ 155
  30_____ 186
  40_____ 216
  50_____ 238
  60_____ 270
  70_____ 304
  80_____ 344
  90_____ 398
  95_____ 422
  E. P_____ 428
  Total distilled_____per cent__ 96
  Residue_____do____ 2
  Loss_____do____ 2

During the first 156 hours of the run the conditions tabulated hereinbelow were maintained. Thereafter conditions were changed and the run was continued for another 49 hours. Throughout this time, all the steam was added ahead of the first tube and all the air after the first tube but ahead of the second tube. The conditions and results obtained are tabulated hereinbelow, with the first vertical column of figures showing the conditions and results for the first 156 hours and the second vertical column of figures showing the conditions and results for the last 49 hours:

|  | 156 hours | 49 hours |
|---|---|---|
| Furnace temperature, °F | 1,850 | 1,850 |
| Hydrocarbon feed, gallons/hr | 1.6 | 2.2 |
| Steam, lbs./gallon feed | 26 | 20 |
| Air, cu. ft./gallon feed | 140 | 102 |
| Cu. ft. carrier gas/gallon feed | 547 | 489 |
| Space-time-yield, cu. ft. carrier gas/cu. ft. catalyst-hr | 1,387 | 1,683 |
| Carrier gas analysis, percent: |  |  |
| Carbon dioxide, $CO_2$ | 8.7 | 7.5 |
| Illuminants | 0.4 | 0.9 |
| Oxygen, $O_2$ | 0.2 | 0.1 |
| Hydrogen, $H_2$ | 50.7 | 50.0 |
| Carbon monoxide, CO | 18.6 | 21.4 |
| Paraffins, $C_nH_{2N+2}$ | 2.8 | 4.2 |
| Nitrogen, $N_2$ | 18.6 | 15.9 |
| Specific Gravity | 0.56 | 0.69 |
| Heating value, B. t. u./cu. ft | 263 | 295 |

The mixed steam and gasoline vapors were heated to from 800° to 1000° before being passed through the first tube (an empty 2″ alloy tube) at an average gas velocity of about 200 feet per second. The average time of contact of the mixture in the first tube amounted to slightly less than 0.1 second. The mixture issued from the first tube at a temperature of from 1100° to 1200° F. and passed at this temperature into the second or catalyst tube which was filled with ¾ inch cubes of refractory brick soaked with a concentrated nickel nitrate solution and thereafter ignited, as described hereinabove. This material contained about 6.4% nickel.

The gas fraction of the material issuing from the first tube was characterized by the following analysis, specific gravity and heating value:

| | Per cent |
|---|---|
| Carbon dioxide, $CO_2$ | 9.6 |
| Illuminants | 16.1 |
| Oxygen, $O_2$ | 0.0 |
| Hydrogen, $H_2$ | 49.4 |
| Carbon monoxide, $CO$ | 11.5 |
| Methane, $CH_4$ | 7.5 |
| Ethane, $C_2H_6$ | 5.9 |
| Nitrogen, $N_2$ | 0.0 |
| Total | 100.0 |
| Specific gravity | 0.56 |
| Heating value (B. t. u.) | 627 |

By way of comparison a run was made for 78 hours under the same conditions but with the second or catalyst tube empty. The conditions and results obtained are tabulated as follows:

| | |
|---|---|
| Furnace temperature, °F | 1,850 |
| Hydrocarbon feed, gallons/hr | 1.0 |
| Steam lbs./gallon feed | 31 |
| Air, cu. ft./gallon feed | 116 |
| Cu. ft. carrier gas/gallon feed | 308 |
| Space-time-yield, cu. ft. carrier gas/cu. ft. catalyst-hr., in terms of heated tube volume | 570 |
| Carrier gas analysis, per cent: | |
| Carbon dioxide, $CO_2$ | 10.3 |
| Illuminants | 4.8 |
| Oxygen, $O_2$ | 0.2 |
| Hydrogen, $H_2$ | 38.3 |
| Carbon monoxide, $CO$ | 12.0 |
| Paraffins, $C_nH_{2n+2}$ | 10.1 |
| Nitrogen, $N_2$ | 24.3 |
| Specific gravity | 0.69 |
| Heating value, B. t. u./cu. ft | 353 |

Runs were also made with cracked gasoline omitting the first tube and passing a mixture of cracked gasoline vapors, steam and air through a tube filled with a catalyst containing 5% nickel. The results of two runs are tabulated as follows:

| | | |
|---|---|---|
| Temperature, Mid Tube Wall, °F | 1,670 | 1,660 |
| Hydrocarbon Feed, gal./hr | 0.15 | 0.06 |
| Steam, lb./hr | 3.1 | 3.3 |
| Air. cu. ft./hr | 17.8 | 13.1 |
| Hydrocarbon Feed, gal./cu. ft. catalyst-hr | 1.6 | 0.7 |
| Steam, lbs./cu. ft. catalyst-hr | 35 | 37 |
| Air, cu. ft./cu. ft. catalyst-hr | 200 | 147 |
| Carrier Gas: | | |
| cu. ft./hr | 57 | 29 |
| cu. ft./gal. feed | 390 | 465 |
| Space Time Yield, cu. ft. catalyst-hr | 640 | 325 |
| Carrier Gas Analysis, Percent: | | |
| $CO_2$ | 4.9 | 7.6 |
| Illuminants | 1.5 | 2.7 |
| $O_2$ | 0.7 | 0.2 |
| $H_2$ | 39.3 | 35.6 |
| $CO$ | 20.0 | 16.8 |
| Paraffins | 5.0 | 4.3 |
| $N_2$ | 28.6 | 32.8 |
| Specific gravity | 0.63 | 0.68 |
| Heating value, B. t. u./cu. ft | 309 | 291 |

The first run had to be terminated after five hours due to carbon deposition, and the second run after fourteen hours for the same reason.

It is therefore apparent that we have invented an improved process and apparatus for gasifying normally liquid hydrocarbons including, as essential features, a pre-heating and thermal selective cracking of a vaporized hydrocarbon mixture in an atmosphere of steam and a further catalytic cracking in the presence of steam and preferably also of air, a blue gas reaction taking place concurrently with both cracking steps. A great advantage of this process is the fact that the process can be carried out for long periods of time without need for catalyst regeneration for removal of carbon deposits and without formation of tars or oils in amounts sufficient to foul the cooling or condenser system. A carrier gas suitable for enrichment with propane or butane vapors or with conventional oil gas can be generated at low cost, since the normally liquid starting material does not require storage under pressure.

Many details for construction, composition and procedure may be varied within a wide range without departing from the principles of this invention and without sacrificing the above indicated advantages. It is, therefore, not our purpose to limit the patent granted on this invention otherwise than necessitated by the scope of the appended claims.

We claim as our invention:

1. A method of preparing a gas interchangeable with coke oven gas, carburetted water gas or mixtures thereof, said method comprising providing a normally liquid hydrocarbon mixture containing a substantial amount of non-paraffinic ingredients and characterized by deposition of non-gaseous material on contact with a high activity cracking catalyst at cracking temperature in the presence of steam, vaporizing said mixture, adding to the resulting vapor steam in an amount ranging from 0.5 to 12 pounds for each pound of vapor, cracking the hydrocarbon vapor at from 800° to 1700° F. in the presence of said added steam but in the absence of a high activity cracking catalyst, separating a normally gaseous and a normally liquid fraction from the resulting product, contacting said normally liquid fraction with a high activity cracking catalyst at from 1000° to 2000° F., incorporating said normally gaseous fraction with the product from said catalytic step to enrich the latter, and adjusting the specific gravity of the enriched gas with a gas of high specific gravity.

2. A method of preparing a gas interchangeable with coke oven gas, carburetted water gas or mixtures thereof, said method comprising providing a normally liquid hydrocarbon mixture containing a substantial amount of non-paraffinic ingredients and characterized by deposition of non-gaseous material on contact with a heavy metal cracking catalyst at cracking temperature in the presence of steam, vaporizing said mixture, adding to the resulting vapor steam in an amount ranging from 0.5 to 12 pounds for each pound of vapor, thermally cracking the hydrocarbon vapor at from 800° to 1700° F. in the presence of said added steam but in the absence of a cracking catalyst to form a product comprising a normally liquid fraction and a normally gaseous fraction containing major proportions of hydrogen, carbon oxides, illuminants, methane and ethane, adding to the resulting product air in an amount ranging up to 100 cubic feet for each pound of said vapor, contacting the resulting air and steam-containing mixture with a heavy metal cracking catalyst at from 1300° to 1850° F., thereafter removing steam from the resulting product, enriching the residual gas with a hydrocarbon-containing gas, and adjusting the specific gravity of the enriched gas with a gas having a high specific gravity.

3. A method of preparing a gas interchangeable with coke oven gas, carburetted water or mixtures thereof, said method comprising providing a normally liquid hydrocarbon mixture containing a substantial amount of non-paraffinic ingredients and characterized by deposition of non-gaseous material on contact with a heavy metal cracking catalyst at cracking temperature in the presence of steam, vaporizing said mixture, adding to the resulting vapor steam in an amount ranging from 0.5 to 12 pounds for each pound of vapor, thermally cracking the hydrocarbon vapor at from 800 to 1700° F. in the presence of said added steam, but in the absence of a cracking catalyst to form a product comprising a normally liquid fraction and a normally gaseous fraction, contacting the normally liquid fraction with a heavy metal cracking catalyst at from 1000 to 2000° F., enriching the gas produced by such contacting with a hydrocarbon containing gas and adjusting the specific gravity of the enriched gas with a gas having a high specific gravity.

4. A method of preparing a gas interchangeable with coke oven gas, carburetted water gas or mixtures thereof, said method comprising providing a normally liquid hydrocarbon mixture containing a substantial amount of non-paraffinic ingredients and characterized by deposition of non-gaseous material on contact with a heavy metal cracking catalyst at cracking temperature in the presence of steam, vaporizing said mixture, adding to the resulting vapor steam in an amount ranging from 0.5 to 12 pounds for each pound of vapor, thermally cracking the hydrocarbon vapor at from 800 to 1700° F. in the presence of said added steam but in the absence of a cracking catalyst to form a product comprising a normally liquid fraction and a normally gaseous fraction containing major proportions of hydrogen, carbon oxides, illuminants, methane and ethane, contacting the resulting steam-containing product with a heavy metal cracking catalyst at from 1300 to 1850° F. to convert all of said product to a gas, thereafter removing steam from the gaseous product of said contacting, enriching the residual gas with a hydrocarbon-containing gas, and adjusting the specific gravity of the enriched gas with a gas having a high specific gravity.

References Cited in the file of this patent

UNITED STATES PATENTS

| Number | Name | Date |
|---|---|---|
| 520,401 | Johnson et al. | May 22, 1894 |
| 1,454,609 | Winter | May 18, 1923 |
| 1,796,299 | Nolan | Mar. 17, 1931 |
| 1,843,063 | Burke | Jan. 26, 1932 |
| 1,846,235 | Wade | Feb. 23, 1932 |
| 1,874,801 | Porter | Aug. 30, 1932 |
| 1,902,004 | Whitlock | Mar. 21, 1933 |
| 1,904,592 | Young et al. | Apr. 18, 1933 |
| 1,904,908 | Voorhees | Apr. 18, 1933 |
| 1,918,254 | Faber | July 18, 1933 |
| 1,929,665 | Wilcox | Oct. 10, 1933 |
| 1,992,909 | Davis | Feb. 26, 1935 |
| 2,056,911 | Schiller et al. | Oct. 6, 1936 |
| 2,077,236 | Harris | Apr. 13, 1937 |
| 2,085,510 | Rider | June 29, 1937 |
| 2,537,708 | Scharmann | Jan. 9, 1951 |
| 2,541,569 | Born | Feb. 13, 1951 |

FOREIGN PATENTS

| Number | Country | Date |
|---|---|---|
| 5,510 | Australia | Jan. 11, 1927 |
| 255,423 | Great Britain | Aug. 19, 1927 |
| 293,007 | Great Britain | Nov. 8, 1928 |
| 296,785 | Great Britain | Dec. 4, 1929 |
| 147,100 | Switzerland | May 31, 1931 |